United States Patent
Carey et al.

(10) Patent No.: US 7,130,613 B2
(45) Date of Patent: Oct. 31, 2006

(54) METHOD FOR REDUCING FRAUDULENT SYSTEM ACCESS

(75) Inventors: Christopher P. Carey, Elmhurst, IL (US); Krsman Kris Martinovich, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 663 days.

(21) Appl. No.: 09/945,462

(22) Filed: Aug. 30, 2001

(65) Prior Publication Data

US 2003/0045271 A1    Mar. 6, 2003

(51) Int. Cl.
H04M 1/66 (2006.01)
(52) U.S. Cl. .................. 455/411; 455/419; 455/435.3; 380/247; 726/16
(58) Field of Classification Search ............... 455/410, 455/411, 434, 435.1; 380/247
See application file for complete search history.

(56) References Cited

U.S. PATENT DOCUMENTS 5,319,711 A * 6/1994 Servi ......................... 380/247
6,591,364 B1 * 7/2003 Patel ......................... 713/170
6,665,530 B1 * 12/2003 Broyles et al. ............. 455/411
2001/0025345 A1 * 9/2001 Jung et al. .................. 713/200
2003/0048764 A1 * 3/2003 Diep et al. .................. 370/335

* cited by examiner

Primary Examiner—Gerald Gauthier
(74) Attorney, Agent, or Firm—Lalita W. Pace

(57) ABSTRACT

A method of reducing access to communication system resources by a fraudulent Mobile Station (102). The Mobile Switching Center (104) sends a message to the Authentication Center (106) to invoke a first authentication procedure. The Authentication Center responds with a message including the results of the first procedure, and possibly, parameters for performance of an additional authentication procedure. Based on the contents of the message, the Mobile Switching Center decides whether to delay call setup until after the additional authentication procedure has completed successfully or whether to initiate call setup in parallel with the additional authentication procedure.

4 Claims, 2 Drawing Sheets

METHOD FOR REDUCING FRAUDULENT SYSTEM ACCESS

FIELD OF THE INVENTION

The present invention relates generally to the field of communication systems, and more particularly, to a method for reducing fraudulent system access by a mobile station in a communication system.

BACKGROUND OF THE INVENTION

To prevent call originations by fraudulent mobile stations (MSs), wireless system operators may choose to authenticate a MS using a procedure generally known as Global Challenge Authentication (GCA). During this procedure, the MS uses a random number (RAND) that is broadcast on the control channel to generate an authentication result (AUTHR) that uniquely identifies the MS based on shared secret data (SSD) stored in the MS. The MS uses the AUTHR and a portion of the random number (RANDC) in the call origination attempt and a comparison is made between the received AUTHR and the AUTHR generated by the Authentication Center (AC) using the same input parameters used to determine the authenticity of the MS.

GCA has some potential drawbacks including the potential inability of the serving system to determine the random number from the RANDC received from the mobile; the possibility that the mobile may not include the appropriate authentication parameters in the origination; the possibility that the authentication results may not match for a valid MS due to the SSD in the MS and the AC becoming out of synchronization; and attempts to gain fraudulent system access using a replay scenario can go undetected. As a result of these drawbacks, the wireless system operator may choose to authenticate the origination by performing a unique challenge or SSD update following a global challenge failure or as a follow up to global challenge authentication.

For a mobile origination, the unique challenge and/or SSD update operations are performed on the traffic channel assigned to the MS and may be performed prior to, or in parallel with call setup. If the operation is performed prior to call setup, the authenticity of the MS can be determined before the call is routed at a cost of delaying call setup. If however, the operation is performed in parallel with call setup, no delay is encountered. However, there is a risk that the call may be answered before the operation is complete which could result in fraudulent usage of system resources if the MS fails the authentication. Further, if the origination was performed to update the subscriber profile via a feature code, a fraudulent MS could update the valid subscriber profile. This could result in a loss of revenue for the wireless system operator if, for example, a fraudulent MS activated call forwarding and registered a long distance number as the forwarding number with the intention of obtaining free long distance service.

It has been found that in order to minimize call setup delay while preventing fraudulent system access, a good approach is to utilize GCA and perform subsequent traffic channel authentication operations based on the outcome of the global challenge. If the GCA is successful, any subsequent authentication operation (e.g. SSD update) should be performed in parallel with call setup because the authenticity of the MS has been verified and there is no reason to delay call setup. However, if GCA is not successful, a subsequent authentication operation, if any, should be performed prior to call setup because the authenticity of the MS has not been verified.

Chapter 6, sections 4.4.3 and 4.4.4 of Cellular Radiotelecommunications Intersystem Operations (ANSI/TIA/EIA-41-D), which is herein referred to as ANSI-41, defines the messages and parameters that are used by a serving mobile switching center (MSC) to request authentication of a mobile system access from the MS's AC. The response to the authentication request may contain a parameter (Deny Access) indicating that the authentication failed and that access should be denied. Alternatively, the response may contain parameters requesting the additional authentication operations (e.g.,unique challenge or SSD update) be performed. Currently, ANSI-41 does not allow the response to include both the Deny Access parameter and parameters requesting an authentication operation. Thus, if the AC requests that a subsequent authentication operation be performed following a GCA failure, the serving MSC will have no knowledge of the authentication failure. As a result, the serving MSC will be unable to decide based on the result of the GCA whether to perform the requested operation prior to or in parallel with call setup. This could lead to fraudulent system access or fraudulent subscriber feature profile updates.

Thus there is a need for a method by which the MSC can decide when to initiate call setup based on knowledge of the GCA procedure results.

DETAILED DESCRIPTION OF THE DRAWINGS

The present invention provides a method by which call setup can be scheduled based on knowledge of the GCA procedure results. In the preferred embodiment, the method allows a serving MSC to make decisions regarding whether call setup should be delayed when performing an authentication operation on the traffic channel based on the outcome of GCA.

Figure 1:
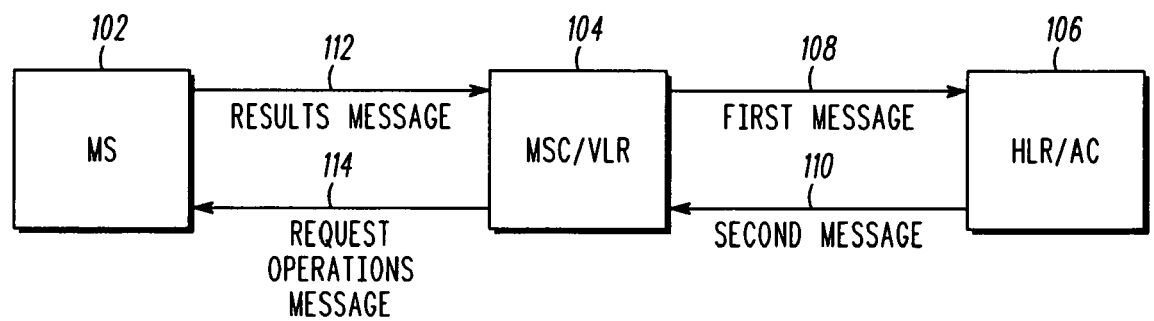
FIG. 1 is a block diagram of a system that can be used to implement the method of reducing fraudulent system access of the present invention.

FIG. 1 is a block diagram of a communication system 100 that can implement the preferred embodiment of the present invention. The system 100 includes a Mobile Switching Center/Visitor Location Register (MSC/VLR) 104 coupled between a Mobile Station (MS) 102 and a Home Location Register/Authentication Center (HLR/AC) 106. It should be recognized by one of ordinary skill in the art that the system 100 may include multiple MSs. The invention may be implemented in a system comprising any MS capable of authentication, a MSC/VLR model number EMX2500 or EMX5000 and a HLR/AC model number HLR41/AC. All three components are available from Motorola, Inc. The MSC/VLR 104 transmits a first message, preferably an ANSI-41 AuthenticationRequest INVOKE message 108, to the HLR/AC 106 to invoke GCA on the MSs. Upon receipt of the first message 108, the HLR/AC 106 processes the message according to authentication procedures defined in ANSI-41. The HLR/AC 106 sends a second message, preferably an ANSI-41 AuthenticationRequest RETURN RESULT (ARRR) message 110, to the MSC/VLR 104 informing the MSC/VLR 104 of the GCA result. In accordance with the preferred embodiment of the present invention, if the GCA fails, the ARRR message 110 includes a new parameter called AuthenticationFailureEvent (AFE), which contains the reason for the authentication failure. Additionally, if the HLR/AC 106 is provisioned to initiate a follow-up authentication operation, such as a unique challenge (authentication of a particular MS) or SSD update, the ARRR message 110 also includes the parameters necessary for the follow-up authentication operation. The MSC/VLR 104 communicates with the MS 102 through message 114 to request the follow-up authentication operations and through message 112 to receive the results.

Figure 2:
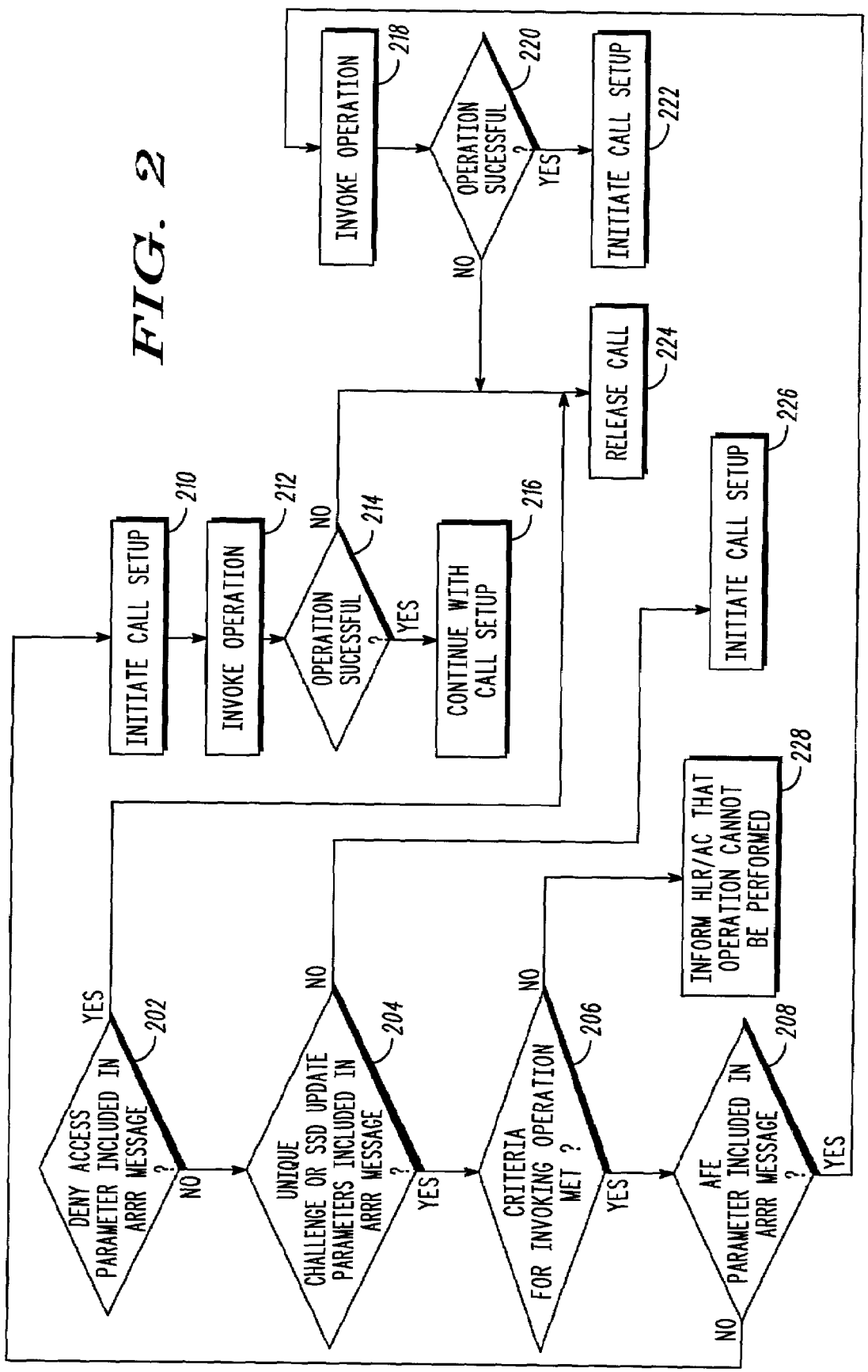
FIG. 2 is a flow diagram of the preferred embodiment of the method of reducing fraudulent system access of the present invention

The addition of the AuthenticationFailureEvent parameter to the ARRR message 110 allows the MSC/VLR 104 to make decisions regarding whether call setup for the MS 102 should be delayed while performing the follow-up authentication operation on the traffic channel. This minimizes call setup delay while reducing the occurrence of fraudulent system access by the MS 102. FIG. 2 is a flow diagram of the preferred embodiment of the method of reducing fraudulent system access by a mobile station. As previously stated, when the MSC/VLR 104 desires to authenticate a MS on system access, it sends an AuthenticationRequest INVOKE message 108 to the HLR/AC 106 to invoke GCA authentication. Upon receiving the message 108, the HLR/AC 106 performs authentication processing according to known procedures. Upon completion, the HLR/AC 106 sends an ARRR message 110 to the MSC/VLR 104.

Referring to FIG. 2, at step 202, the MSC/VLR 104 determines whether the Deny Access parameter is included in the ARRR message. If the parameter is not included, the MSC/VLR 104 determines whether parameters associated with other operations, such a unique challenge or SSD update, are included in the ARRR message (step 204). If such parameters are included, at step 206, the MSC/VLR 104 determines whether the criteria for invoking the operation are met. If the criteria are met, the MSC/VLR 104 determines whether the AuthenticationFailureEvent parameter is included in the ARRR message (step 208). If the parameter is included, the MSC/VLR 104 invokes the operation (step 218). At step 220, the MSC/VLR 104 determines whether the operation is successful. If the operation is successful, the MSC/VLR 104 initiates call setup (step 222). If the operation is not successful, the MSC/VLR 104 releases the call (step 224). Thus, by including both a notification that the initial authentication (GCA authentication) failed and parameters for a subsequent operation (e.g. further authentication) in the ARRR message, the MSC/VLR 104 is able to delay call setup for the MS 102 until determining whether the subsequent operation is successful.

Referring back to step 208, if the AFE parameter is not included in the ARRR message, the MSC/VLR 104 initiates call set up (step 210) and then invokes the subsequent operation (step 212). At step 214, the MSC/VLR 104 determines whether the operation is successful. If the operation is successful, the MSC/VLR 104 continues with call set up (step 216). If the operation is not successful, the MSC/ VLR 104 releases the call (step 224). Thus, if the MSC/VLR 104 receives parameters for a subsequent operation and GCA was successful, it does not delay call setup. Instead, the MSC/VLR 104 initiates call setup in parallel with initiating the subsequent operation. If the operation is successful, call setup is continued. If the operation is unsuccessful, the call is released (i.e., call setup is halted).

Referring back to step 206, if the criteria for invoking the operation are not met, the MSC/VLR 104 informs the HLR/AC 106 that the operation cannot be performed (step 228). Referring back to step 204, if parameters associated with another operation are not included in the ARRR message, the MSC/VLR 104 initiates call setup (step 226). Thus, if GCA does not fail and additional authentication operations are not requested, the MSC/VLR 104 proceeds with call setup. Referring back to step 202, if the deny access parameter is included in the ARRR message, the MSC/VLR 104 releases the call (step 224).

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method of reducing fraudulent access to communication system resources by a mobile station, the method comprising the steps of:

transmitting a first message to invoke performance of a first authentication procedure;

receiving a second message containing a first parameter indicating a status of the first authentication procedure and containing at least a second parameter associated with a second authentication procedure; and in response to receiving the second message, determining whether the first parameter indicates that the first authentication procedure completed successfully; and when the first parameter indicates that the first authentication completed successfully, initiating call setup before the second authentication procedure has completed.

2. The method of claim 1 wherein when the first parameter indicates that the first authentication completed successfully, the method further comprises the steps of:

when the second authentication procedure completes successfully, continuing with call setup; and when the second authentication procedure does not complete successfully, discontinuing call setup.

3. The method of claim 1 wherein the second authentication procedure is a Unique Challenge procedure.

4. The method of claim 1 wherein the second authentication procedure is an SSD Update procedure.

* * * * *